March 25, 1969 B. W. KEESE 3,434,364

VEHICLE DRIVE ASSEMBLY

Filed Aug. 8, 1967 Sheet 1 of 2

INVENTOR.
BEVERLY W. KEESE
BY Strauch, Nolan, Neale, Nies & Kurz
ATTORNEYS

INVENTOR.
BEVERLY W. KEESE
BY
Strauch, Nolan, Neale, Nies & Kurz
ATTORNEYS 3,434,364
VEHICLE DRIVE ASSEMBLY
Beverly W. Keese, Neenah, Wis., assignor, by mesne assignments, to Rockwell-Standard Company, Pittsburgh, Pa., a corporation of Delaware
Filed Aug. 8, 1967, Ser. No. 659,142
Int. Cl. F16h *35/00*
U.S. Cl. 74—391 12 Claims

ABSTRACT OF THE DISCLOSURE

A vehicle drive assembly, particularly for an independent wheel drive, comprises a support structure attached to the vehicle frame and mounting a succession of gear mechanisms providing four gear reductions between the input and the wheel. These mechanisms comprise a selective two speed sliding gear mechanism driven by a motor, and a planetary gear reduction and a clutch between the output of the sliding gear mechanism and a shaft that in turn is connected to the wheel by a further planetary gear reduction. All of the gears in the two speed sliding gear mechanism are individual gears that may be replaced to provide gear sets of different ratio, so that any desired combination can be built into the mechanism without using conventional gear cluster combinations, and this reduces inventory as well as enlarging the number of combinations involved. Specifically the output shaft of the two speed mechanism carries the sun gear of the first planetary reduction mechanism, and the planet gear carrier of the first planetary reduction mechanism is selectively clutched to drive the sun gear of the second planetary reduction mechanism, the planet carrier of which is attached to the wheel.

*History and summary of invention*

The invention relates mainly to the field of independent wheel drives wherein a motor, hydraulic or electric, is connected by reduction gearing to the wheel. This drive may be used at each wheel of the vehicle. Various gearing arrangements have been proposed for this purpose, and the object of the present invention is to provide a novel association of drive mechanism providing a large number of gear reductions and capable of being assembled with different gear ratio combinations, and this is the major object of the invention.

Examples of typical prior art power wheel drives will be found in the following United States patents: No. 2,726,726, issued Dec. 13, 1955, to R. G. Le Tourneau, Inc. for Electric Vehicle Wheel; No. 3,115,204, issued Dec. 24, 1963, to D. S. Dence for Power Wheel Assembly; and No. 3,184,994, issued May 25, 1965, for Wheel Drive Mechanism.

Drives of this type have a wide variety of potential applications as in harvesting equipment, street sweepers, log handler-skidders, cable reel carriers, road building equipment, tool carriers, as a fifth wheel for steering used for both constant driving or as a booster or helper drive, etc. For applications such as these it is necessary to provide "low" reductions which will deliver the required torque to the wheels to move the loaded vehicle and also to provide "high" reductions so that the vehicle can be moved at relatively high speeds when required without over-speeding the hydraulic motors. In the present embodiments of this invention, the available "low" reductions are 60.17, 50.31 and 39.41 and the available "high" reductions are 33.87 and 13.76. A further operational requirement is that these vehicles be towed at speeds up to 40 m.p.h. without excessive wear upon or damage to the wheel drive components.

In vehicles of this type, there are severe space limitations on the overall size and weight of the overall units. Specifically, the major portion of these units must be located within the cylindrical space defined by the tire rim and should not project beyond the plane of exterior tire wall so that it is protected by the tire from hittting other objects as the vehicle moves. Since the entire structure is directly supported by the wheel without the protection of any intervening resilient suspension, it must be light in weight but rugged in construction.

The present invention satisfies all of these structural and operational requirements and weighs but about 500 pounds.

A further object of the invention is to provide a novel wheel drive mechanism wherein a selective two speed sliding gear mechanism having an input shaft driven by a motor is connected at its output to two planetary gear reduction mechanisms arranged in succession to drive the wheel, a clutch being provided to selectively establish or interrupt drive between the planetary mechanisms. The invention also includes novel arrangements for housing and mounting these mechanisms in the vehicle, as well as further details which will become apparent in connection with description of the preferred embodiments and the claims.

*Preferred embodiments*

Figure 1:
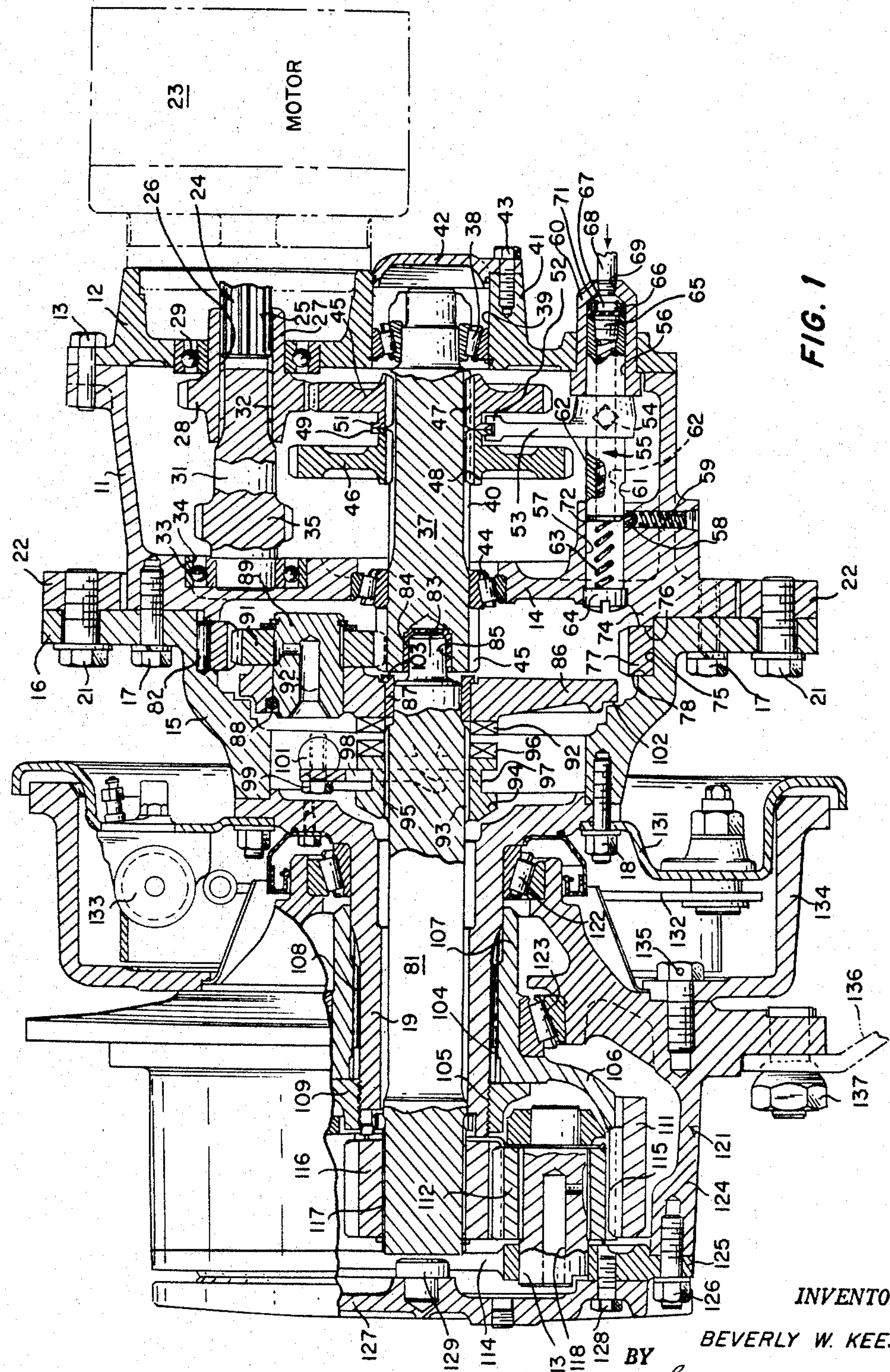
FIGURE 1 is a fragmentary side elevation partly broken away and mainly in section on line 1—1 of FIGURE 2 showing an independent wheel drive according to a preferred embodiment of the invention.
Figure 2:
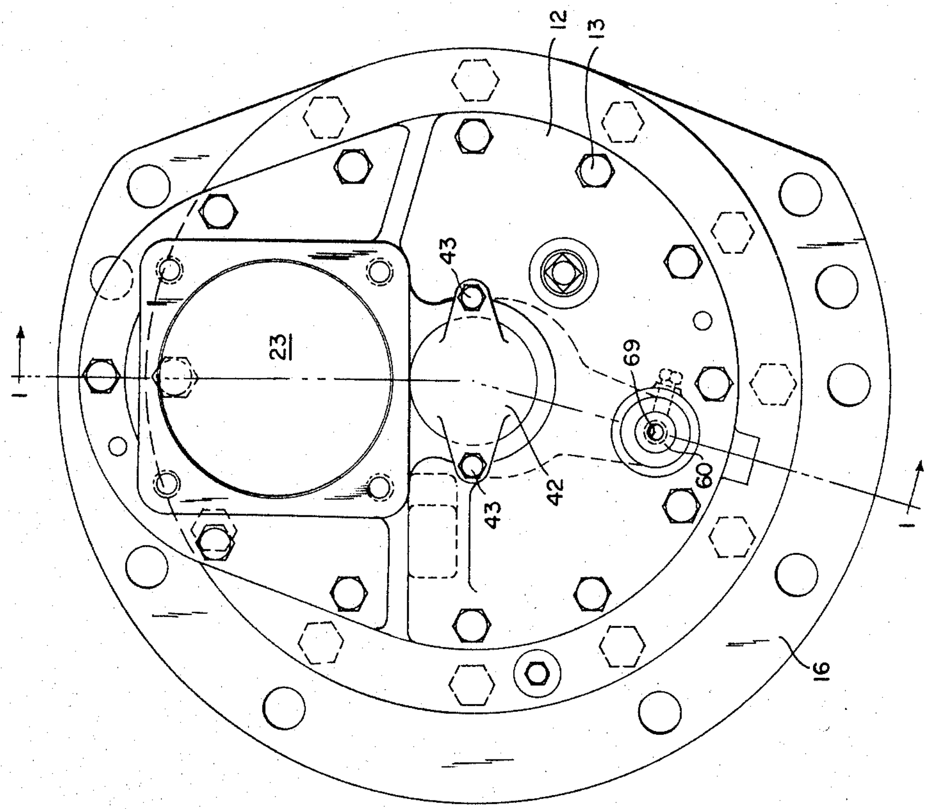
FIGURE 2 is an end view of the drive unit of FIGURE 1.

Referring to FIGURE 1, a change speed gear housing 11 has an end member 12 secured thereto as by bolts 13 and an opposite integral end wall 14. A planetary gear housing 15 is open ended and has an inner end flange 16 secured to housing 11 by bolts 17. At its outer end housing 15 has secured thereto by bolts 18 a hollow wheel mounting spindle 19. Housings 11 and 15 and spindle 19 are rigidly interconnected. The rigid assembly of housings 11, 15 and spindle 19 is mounted on the vehicle frame as by bolts 21 securing flange 16 to a bracket 22. Bracket 22 is rigidly attached to the vehicle frame (not shown), and it will be understood that the vehicle illustrated has at least two of these assemblies laterally aligned and rigidly mounted at opposite sides of the frame.

A motor 23, preferably hydraulic although it may be electric, is fixedly mounted on housing end member 12, and its output shaft 24 has a splined section 25 fitting within the splined bore 26 of hub 27 of an input pinion gear 28 within housing 11. Gear hub 27 is rotatably mounted on end member 12 by a ball bearing unit 29.

A short input shaft 31, coaxial with motor shaft 24, has a splined end 32 extending into bore 26, whereby the gear hub 27 is non-rotatably coupled to both shafts 24 and 31. The other end of shaft 31 is rotatably mounted on the end wall 14 of housing 11 by a ball bearing unit 33 seated in a wall recess 34 that opens to the interior of housing 11. A gear 35 is rigid and preferably integral with shaft 31 in axially spaced relation to gear 28 within housing 11.

A countershaft 37 extends through housing 11 parallel to shaft 31 and its outer end is rotatably mounted on end member 12 in a tapered roller bearing unit 38 disposed within the bore 39 of a hollow boss 41. The end of bore 39 is closed by a cap 42 secured to end member 12 by screws 43. Shaft 37 extends through an aperture in wall 14, wherein it is rotatably mounted in a tapered roller bearing unit 44, and terminates within housing 15 in an integral gear 45 which is the sun gear of the first planetary reduction gear mechanism in the drive.

Intermediate bearings 38 and 44, shaft 37 is longitudinally splined at 40 for slidably but non-rotatably mounting two separate side by side gears 45 and 46. The hub of gear 45 is internally splined at 47, and the hub of gear 46 is internally splined at 48. The gear hubs abut end to end and are formed with similar side by side annular end flanges 49 and 51. Flanges 49 and 51 are embraced by the bifurcated jaw 52 of a shift fork 53 that is secured by bolt 54 to a shift plunger 55 that is secured by bolt 54 to a shift plunger 55 that is slidably mounted at opposite ends in bore 56 in member 12 and bore 57 in wall 14. In practice bore 56 may be formed in a separate hollow sleeve 60 welded or similarly fixed to member 12.

Jaw 52 comprises the sole interconnection between gears 45 and 46, aside from their slidable support on shaft 37, and it maintains them in their side by side relation for shift together during operation. By using individual gears at 28, 35 and at 45, 46 it is possible to substitute different gears for different ratio drives, which is an advantage over integral gear clusters conventionally used.

A ball detent 58 is mounted in bore 57, spring biased outwardly at 59, and it is adapted to engage plunger 55 for indicating and holding the plunger in selected gear ratio positions as will appear.

Plunger 55 has a through bore 62 through which extends a coiled compression spring 63 that has one end abutting a plug 64 fixed in housing bore 57 and its other end abutting a plug 65 closing an end of plunger bore 62. A fluid tight rubber or like piston seal cup 66 is disposed within the chamber 67 formed between the closed end of plunger 55 and the housing, and a hydraulic line 68 is connected at opening 69 to supply fluid to chamber 67. Spring 63 urges plunger 55 toward the illustrated high speed position of FIGURE 1, and an internal light spring 71 in chamber 67 keeps cup 66 against the plunger end. Engagement of ball detent 58 with the chamfered end 72 of the plunger helps maintain the plunger in the FIGURE 1 position.

Selectively fluid under pressure may be introduced into chamber 67 to displace plunger 55 to the left to an intermediate position where detent 58 seats in notch 61 to maintain the gearing in neutral position wherein none of the gear on shafts 31 and 37 are intermeshed, or to a low speed wherein only gears 46 and 35 are meshed.

Housing 11 has an annular outer end flange 74 piloted with a cylindrical end bore 75 formed within the adjacent open end of housing 15, and the flat end face 76 of flange 74 axially abut one side of an internal ring gear 77 seated in bore 75 with other side abutting axial shoulder 78 at the bottom of bore 75. Thus, when bolts 17 are drawn tight, this axially secures ring gear 77 rigidly to the housings. To further prevent rotation of ring gear 77 a plurality of cross pins 82 rigidly embedded in housing 15 extend into corresponding peripheral surfaces notches in ring 77.

A stub shaft 81, coaxial with shaft 37, extends through spindle 19 and has a reduced end section 83 rotatably supported by bearing 84 within a recess 8 in the end of shaft 37. Shaft 81 outwardly of bearing 84 thus has radial float in the outer planetary assembly. A planet gear carrier 86 is rotatably mounted by bearing sleeve 87 upon shaft 81. Fixed to carrier 86, as by fasteners indicated at 88, are a plurality of planet pinion shafts 89 only one of which is shown in FIGURE 1. Each shaft 89 rotatably mounts a planet pinion 91 constantly meshed wtih both the sun gear 45 and the ring gear 77. Each shaft 89 has a lubricant passage 92 leading to the internal bearing surface of the pinion thereon.

Carrier 86 is formed with an annular row of axially facing clutch teeth 92. Shaft 81 has a short axially splined section 93 on which a clutch collar 94 is axially slidably mounted by internal splines 95. Collar 94 is formed with an annular row of clutch teeth 96 adapted to mesh with teeth 92 when the collar is shifted to the right in FIGURE 1 for selectively connecting carrier 86 non-rotatably to the shaft 81. As shown the clutch teeth preferably have a negative rake to assure positive engagement when transmitting torque load.

Collar 94 has an annular groove 97 receiving a shift fork 98 secured by bolt 99 to a rotatably mounted rod 101. Shift mechanism for rocking rod 101 will be later described in connection with FIGURE 3.

When clutch collar 94 is disengaged from carrier 86, rotation of shaft 37 is not transmitted to shaft 81, but when collar 94 is coupled to carrier 86 shaft 81 is driven through sun gear 45, planet pinions 91, carrier 86 and the clutch collar at a desired speed reduction. Carrier 86 has axial running clearance with the housing wall at 102 and with flange 103 of the bushing 87 at which is preferably rigid with shaft 81. This provides a desirable measure of axial float of the carrier. The planetary pinions 91 mesh with ring gear 77 and sun gear 45 so as to permit a desired amount of radial float at the carrier.

The outer end of spindle 19 has a longitudinally splined section 104 followed by a threaded terminal 105. A ring gear mounting member 106 has an elongated hub 107 that is internally splined at 108 for nonrotatable mounting on spindle section 104, and a nut 109 on terminal 105 secures member 106 against axial movement. An internal ring gear 111 is mounted on member 106 with provision for limited radial float and in surrounding relation to a plurality of planet pinions 112 that are rotatably mounted on shafts 113 fixed to a carrier 114. Ring gear teeth 115 are constantly meshed with pinions 113, and pinions 113 are constantly meshed with a sun gear 116 nonrotatably secured with provision for limited radial float as by a splined fit at 117 on the outer end of shaft 81.

Shafts 113 are each formed with passages 118 open at their outer ends to receive lubricant directed thereinto during operation and conduct the lubricant to the bearing surfaces of pinion gears 112.

A wheel hub 121 is rotatably mounted by inner and outer tapered roller bearing units 122 and 123 respectively on spindle 19 and hub 107 which is rigid with the spindle. Hub 121 has a hollow cylindrical portion 124 surrounding the outer planetary assembly and carrier 114 has an external flange 125 that is secured to the hub end by bolts 126. An outer hub end plate 127 is secured to carrier 114 by bolts 128, the carrier and cap combining to close the outer end of the wheel hub. A wear button 129 is fixed on the inside of cap in axial alignment with the end of shaft 81 to limit axial float of the shaft.

The foregoing provides a speed reduction drive mechanism from shaft 81 to wheel hub 121. This mechanism including the related wheel and lubricating arrangements is preferably the same as disclosed in Bixby Patent No. 3,150,532, issued Sept. 29, 1964, for Drive Axles.

Bolts 18 that secure spindle 19 to housing 15 also secure upon spindle 19 a brake mechanism support plate or spider 131 which carries the brake shoes indicated at 132 and the actuator 133. A brake drum 134 is secured on wheel hub 121 by bolts 135, and the usual wheel indicated at 136 is secured to hub 121 by lug bolt and nut assemblies 137.

Figure 3:
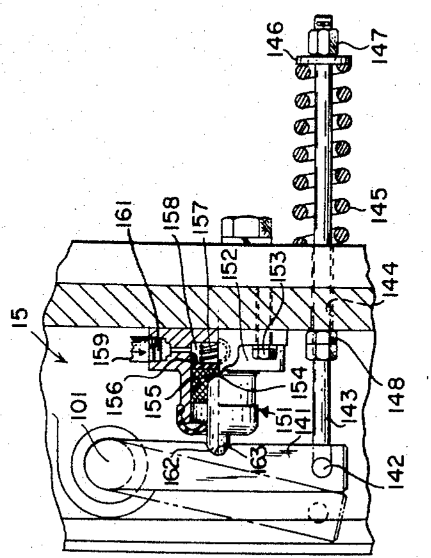
FIGURE 3 is a fragmentary view mainly in section showing declutch control mechanism.

Referring to FIG. 3, shaft 101 has fixed thereon an arm 141 that has a pivotal connection 142 to a rod 143 slidably mounted in a bore 144 in housing 15. Outside the housing rod 143 is surrounded by a coiled compression return spring 145 disposed between the housing and a slidable washer 146 backed by a nut 147 threaded on the outer end of the rod. Spring 145 biases arm 141 to swing shaft 101 counterclockwise in FIGURE 3 and counterclockwise in FIGURE 1 to normally engage the clutch teeth 96 and 92.

Movement of arm 141 counterclockwise in FIGURE 3 is limited by the adjustable locknut stop assembly 148 threaded on rod 143 within the housing and abutting the inner surface of the housing.

A fluid pressure cylinder unit 151 has a housing 152 secured upon the wall of housing 15 by bolts 153. Interiorly a piston 154 is slidable in a bore 155 that at one end contains a piston seal cup 156 biased against the piston by a spring 157 within chamber 158. A hydraulic fluid line 159 is connected to a housing opening 161 leading into chamber 158. A piston rod 162 seated at one end on piston 154 extends into a rounded recess 163 in arm 141. When the cylinder unit is energized, piston rod 162 is projected to swing arm 141 clockwise in FIGURE 3, and this rotates shaft 101 to swing fork 98 to displace collar 94 to the left in FIGURE 1 to disengage the drive from carrier 86. When the fluid pressure in chamber 158 is released spring 145 swings arm 141 counterclockwise to displace collar 94 to the right to mesh teeth 96 and 92 and establish drive to shaft 81. The resilient displacement of collar 94 reduces wear on the clutch teeth. Compressed spring 145 limits movement of piston 154 in the declutch direction, and stop 148 limits clutch engaging movement.

In operation motor 23 drives input gear 28 and shaft 31. A suitable control valve (not shown) is operated to selectively displace plunger 55 to mesh either gears 45 and 28 for high speed drive, or gears 46 and 35 for low speed drive, to shaft 37. Rotation of shaft 37 is imparted to carrier 86 as the planet pinions roll around within ring gear 77, but the wheel is not driven until clutch collar 94 has been displaced by operator control (not shown) into mesh with the carriers. When the clutch is engaged the wheel is driven through shaft 81, sun gear 116, planet pinions 112 which are meshed with non-rotatable ring gear 111, and carrier 114 attached to the wheel.

The individual gears of the pairs 28, 45 and 35, 46 may be replaced by other gear pairs providing desired ratios. Thus for example, individual high and low gear pairs may be manufactured and stocked separately, which simplifies inventory and repair.

In a preferred embodiment a speed reduction of about 5 to 2 is provided in the planetary gearing in housing 15, and a speed reduction of about 3.6 to 1 is provided in the wheel. These reductions, together with the two reductions available in the change speed gearing in housing 11 provide four reductions between the motor and wheel. By providing the clutch for disengagement of the drive at collar 94, wear on the outer planetary is reduced.

The gears is housing 11 may be replaced in the field or elsewhere without diassembly of the entire drive unit in the vehicle. This can be done by removing motor 23, cap 42 and housing end member 12 for access to the gearing.

The foregoing drive assembly provides a compact space saving efficient unit wherein high operating temperatures are avoided and the necessity of external cooling means eliminated by locating most of the gearing out of nested relation within the wheel hub and away from the relatively expensive wheel bearings.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A vehicle drive assembly comprising multispeed drive gear mechanism having an input adapted to be connected to a drive motor, means providing a first planetary gearing speed reduction mechanism connected to be driven by said multispeed drive gear mechanism, means providing a second planetary gearing speed reduction mechanism, and drive means comprising a selectively operable clutch for interconnecting said planetary mechanisms.

2. The vehicle drive assembly defined in claim 1, wherein said second planetary gear mechanism is drive connected to a road engaging wheel.

3. The vehicle drive assembly defined in claim 1, wherein said first planetary gear mechanism comprises a sun gear driven from the output side of said multispeed drive gear mechanism and a rotatable carrier mounting a plurality of planet pinions meshed with said sun gear and a relatively fixed ring gear, and said clutch is operable to selectively drive connect said carrier to the second planetary gear mechanism.

4. The vehicle drive assembly defined in claim 3, wherein said second planetary gear mechanism comprises a shaft, and said clutch comprises a clutch element slidably nonrotatably mounted on said shaft for selective displacement into drive engagement with a clutch element on said carrier.

5. The vehicle drive assembly defined in claim 4 wherein said sun gear is carried by the end of a driven shaft of said multispeed gear mechanism, said shaft of the second planetary gear mechanism is coaxially rotatably mounted in a recess in said end of said driven shaft, and said slidable clutch element is a clutch collar slidably splined on said shaft of the second planetary gear mechanism.

6. In the vehicle drive assembly defined in claim 4, means for shifting said clutch element comprising a fluid pressure responsive device operably connected when energized to displace said element to disengage said clutch, and spring means operable when said device is deenergized for oppositely displacing said element to engage said clutch.

7. The vehicle drive assembly defined in claim 1 wherein said multispeed gear mechanism comprises a driven shaft carrying a sun gear for said first planetary gear mechanism and said second planetary gear mechanism comprises a rotatable sun gear mounting outer shaft coaxial with said driven shaft, a planet gear carrier for said first planetary gear mechanism is rotatably mounted on said outer shaft, and said clutch comprises a clutch element nonrotatably slidably mounted on said outer shaft for displacement into engagement with a clutch element on said carrier.

8. In the vehicle drive assembly defined in claim 1, said multispeed drive gear mechanism comprising an input shaft assembly mounting two axially spaced gears of different size, a counter shaft on which two separate but axially adjacent gears of different size are slidably mounted, and means for selectively displacing said gears on the counter shaft together for meshing one or the other of said counter shaft gears with a coacting one of said input shaft gears for driving said counter shaft at a selected speed, said gears all being individually replaceable for providing different speed ratio drives of said counter shaft.

9. The vehicle drive assembly defined in claim 1 comprising a rigid support structure mounting all of said mechanisms, and means for attaching said support structure to the frame of said vehicle.

10. The vehicle drive assembly defined in claim 9, wherein said support structure comprises a first housing portion wherein said multispeed gear mechanism is enclosed, a second housing portion enclosing said first planetary gear mechanism and secured to said first housing portion, and a wheel mounting spindle secured to said second housing portion.

11. In the vehicle drive assembly defined in claim 10, said multispeed gear mechanism having a driven shaft projecting into said second housing portion and mounting a sun gear for the first planetary gear mechanism, an outer sun gear mounting shaft of the second planetary gear mechanism rotatably mounted in said spindle and projecting into said second housing portion, means rotatably mounting the planet gear carrier of said first planetary gear mechanism on said outer shaft, and said clutch comprising a clutch element nonrotatably slidably mounted on said outer shaft within said second housing portion for displacement into engagement with a clutch element on said carrier.

12. In the vehicle drive assembly defined in claim 11, a drive motor unit mounted on said first housing portion with its output shaft connected to drive said multispeed gear mechanism, and a wheel hub rotatably mounted on spaced bearings on said spindle and enclosing said second planetary gear mechanism.

References Cited

UNITED STATES PATENTS

| | | | |
|---|---|---|---|
| 1,355,607 | 10/1920 | Janicki | 74—390 |
| 1,464,887 | 8/1923 | Starr | 180—75 |
| 1,783,780 | 12/1930 | Evans | 180—75 |
| 2,759,374 | 8/1956 | Bowman et al. | 74—391 X |
| 3,090,456 | 5/1963 | Blenkle. | |
| 3,157,239 | 11/1964 | Bernotos. | |

FOREIGN PATENTS

| | | |
|---|---|---|
| 399,140 | 10/1942 | Italy. |

DONLEY J. STOCKING, *Primary Examiner.*

T. C. PERRY, *Assistant Examiner.*

U.S. Cl. X.R.

74—325, 740; 180—75